United States Patent
Ramoutar et al.

(10) Patent No.: US 9,283,988 B1
(45) Date of Patent: Mar. 15, 2016

(54) SYSTEMS AND METHODS OF DECOUPLING VEHICLE STEERING SYSTEMS

(71) Applicant: Toyota Motor Engineering & Manufacturing North America, Inc., Erlanger, KY (US)

(72) Inventors: Naipaul D. Ramoutar, Ann Arbor, MI (US); Ronald Bowers, New Hudson, MI (US); Adam Karibian, Ann Arbor, MI (US); Nathan Jordan, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/610,352

(22) Filed: Jan. 30, 2015

(51) Int. Cl.
*B62D 7/22* (2006.01)
*B62D 7/18* (2006.01)

(52) U.S. Cl.
CPC .. *B62D 7/22* (2013.01); *B62D 7/18* (2013.01); *B62D 7/228* (2013.01)

(58) Field of Classification Search
CPC ............. B62D 7/18; B62D 7/228; B62D 7/22
See application file for complete search history.

(56) References Cited

U.S. PATENT DOCUMENTS

| | | | |
|---|---|---|---|
| 5,427,411 A | 6/1995 | Iwasaki et al. | |
| 5,482,322 A | 1/1996 | Wheatley et al. | |
| 6,276,702 B1 * | 8/2001 | Turck et al. | 280/93.511 |
| 7,695,016 B2 | 4/2010 | Gogate | |
| 7,762,567 B2 * | 7/2010 | Marur | 280/93.5 |
| 7,819,218 B2 | 10/2010 | Eichberger et al. | |
| 7,841,605 B1 * | 11/2010 | Morgan | 280/89.11 |
| 8,562,021 B1 | 10/2013 | Kuwabara et al. | |
| 8,646,793 B1 | 2/2014 | Lam et al. | |
| 8,807,632 B2 | 8/2014 | Ramoutar et al. | |
| 2005/0051985 A1 * | 3/2005 | Kim | 280/93.512 |
| 2006/0267329 A1 * | 11/2006 | Porter et al. | 280/777 |
| 2008/0284150 A1 | 11/2008 | Yamada | |
| 2010/0018797 A1 * | 1/2010 | Marur | 180/443 |
| 2014/0252741 A1 | 9/2014 | Corby et al. | |

FOREIGN PATENT DOCUMENTS

WO    WO2014015094    1/2014

* cited by examiner

*Primary Examiner* — Drew Brown
(74) *Attorney, Agent, or Firm* — Dinsmore & Shohl LLP

(57) ABSTRACT

A vehicle includes a front wheel. A steering column assembly is coupled to the front wheel. The steering column assembly includes a steering wheel and a steering column coupled to the steering wheel. A steering rack assembly includes a rack coupled to the front wheel. The rack extends in a vehicle lateral direction and is translatable with respect to a body of the vehicle in the vehicle lateral direction. A steering knuckle assembly is coupled to the steering rack assembly by a tie rod. A tie rod disconnect feature decouples the steering knuckle assembly and the steering rack assembly upon movement of the tie rod beyond a predetermined distance.

20 Claims, 8 Drawing Sheets

SYSTEMS AND METHODS OF DECOUPLING VEHICLE STEERING SYSTEMS

TECHNICAL FIELD

The present specification generally relates to vehicles and vehicle systems, and more specifically to vehicles and vehicle systems for decoupling vehicle steering systems.

BACKGROUND

Vehicles may be equipped with steering systems that allow an occupant to steer the vehicle. Vehicles may also be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and more particularly to a front wheel of the front suspension unit. As the unabsorbed energy is directed into the front wheel, the energy may cause the front wheel, and subsequently a steering system of the vehicle, to rotate.

Accordingly, a need exists for alternative methods and systems for decoupling vehicle steering systems during a small front bumper overlap impact.

SUMMARY

In one embodiment, a vehicle includes a front wheel. A steering column assembly is coupled to the front wheel. The steering column assembly includes a steering wheel and a steering column coupled to the steering wheel. A steering rack assembly includes a rack coupled to the front wheel. The rack extends in a vehicle lateral direction and is translatable with respect to a body of the vehicle in the vehicle lateral direction. A steering knuckle assembly is coupled to the steering rack assembly by a tie rod. A tie rod disconnect feature decouples the steering knuckle assembly and the steering rack assembly upon movement of the tie rod beyond a predetermined distance.

In another embodiment, a steering system for a vehicle includes a steering column assembly including a steering wheel and a steering column coupled to the steering wheel. A steering rack assembly includes a rack that extends in a vehicle lateral direction and is translatable with respect to a body of the vehicle in the vehicle lateral direction. A steering knuckle assembly is coupled to the steering rack assembly by a tie rod. A tie rod disconnect feature decouples the steering knuckle assembly and the steering rack assembly upon movement of the tie rod beyond a predetermined distance.

In another embodiment, a method of decoupling a steering wheel of a vehicle from a front wheel of the vehicle is provided. The method includes contacting an object with the front wheel of the vehicle. The object rotates the front wheel out of a driving direction of the vehicle. A steering knuckle assembly and steering rack assembly are decoupled by disconnecting a tie rod using a tie rod disconnect feature that decouples the steering knuckle assembly and the steering rack assembly upon movement of the tie rod beyond a predetermined distance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles and vehicle systems according to the present specification include a tie rod disconnect feature that is used to decouple a steering system to inhibit unintended rotation of a steering wheel, particularly during a small front bumper overlap impact during which a front wheel of the vehicle may experience unintended rotation out of a driving direction of the vehicle. The tie rod disconnect feature may provide an uncoupling structure, such as a stop or ramp surface, that is used to influence movement of the tie rod and decouple the steering wheel from the rotating front wheel. In some embodiments, the tie rod disconnect feature may be located at a steering knuckle assembly to decouple the steering system at the front tire. In some embodiments, the tie rod disconnect feature may be located at a steering rack assembly to decouple the steering system at the steering rack assembly.

Figure 1:
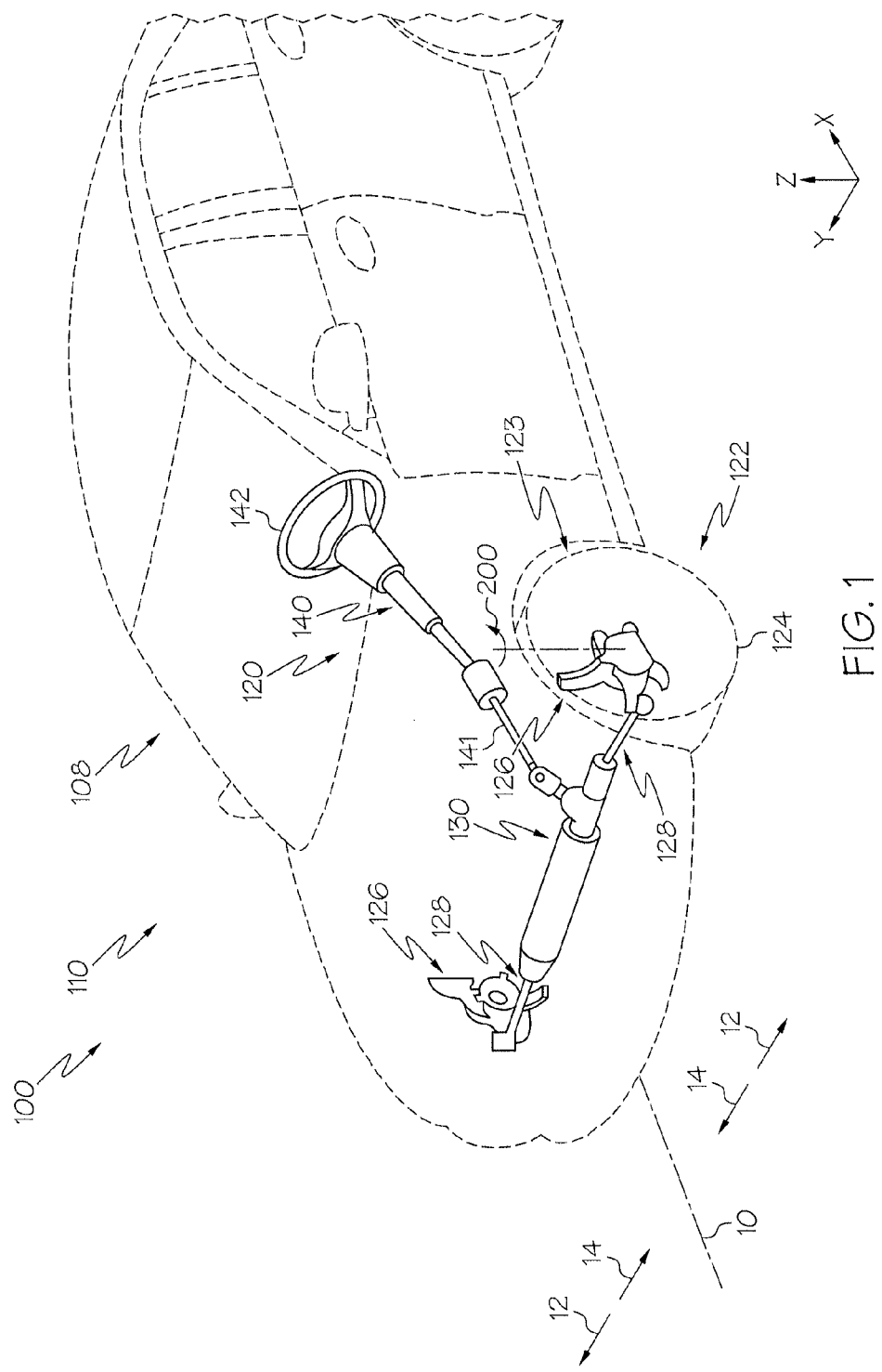
FIG. 1 schematically depicts a perspective view of a vehicle including a steering system according to one or more embodiments shown or described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 100 is depicted. The vehicle 100 includes a body 110 onto which a vehicle drivetrain is coupled. The vehicle 100 also includes a cabin 108 that is integral with the body 110. The cabin 108 generally defines a passenger cabin of the vehicle 100.

The vehicle 100 includes a steering system 120. The steering system 120 generally includes a front wheel 124, a steering rack assembly 130 and a steering column assembly 140. The steering system 120 may include a pair of front suspension units 122 that are coupled to the body 110. The front suspension units 122 may generally include vehicle components that connect the body 110 of the vehicle 100 to the front wheel 124. These components may include a front chassis member that includes a spring and a strut. The spring and the strut may be coupled to a steering knuckle assembly 126 and the front wheel 124 may be coupled to the steering knuckle assembly 126.

The steering knuckle assembly 126 may be coupled to a tie rod 128 that is positioned inboard of the front wheel 124. The tie rod 128 is also coupled to the steering rack assembly 130. Accordingly, the front wheel 124 is coupled to the steering rack assembly 130 through the steering knuckle assembly 126 and the tie rod 128. The steering rack assembly 130 extends in the vehicle lateral direction and is configured to manipulate an orientation of the front wheel 124 with respect to the body 110, as will be described in greater detail herein.

The steering column assembly 140 is coupled to the steering rack assembly 130. The steering column assembly 140 includes a steering column 141 that extends rearward and upward of the steering rack assembly 130 in the vehicle longitudinal direction. The steering column assembly 140 also includes a steering wheel 142 that is coupled to the steering column 141 and that is positioned within the cabin 108 of the vehicle 100. Accordingly, the steering wheel 142 is coupled to the front wheel 124, the steering rack assembly 130, the tie rod 128, and the steering knuckle assembly 126. By rotating the steering wheel 142, an occupant of the vehicle 100 may manipulate the orientation of the front wheel 124 with respect to the body 110 of the vehicle 100. Specifically, when the steering wheel 142 is rotated, the front wheel 124 may rotate about an axis 200 with respect to the body 110 of the vehicle 100. By rotating the front wheel 124 about the axis 200 with respect to the body 110 of the vehicle 100, an occupant may steer the vehicle 100 during normal vehicle operation.

Similarly, when the front wheel 124 is rotated about the axis 200 with respect to the body 110, for example when an external force is applied to the front wheel 124, the steering wheel 142 may be rotated. An external force may be applied to the front wheel 124 during a variety of driving or testing conditions, including driving the vehicle 100 over an uneven driving surface, or an impact to the vehicle 100, such as a small front bumper overlap impact, as will be described in greater detail herein.

Figure 2:
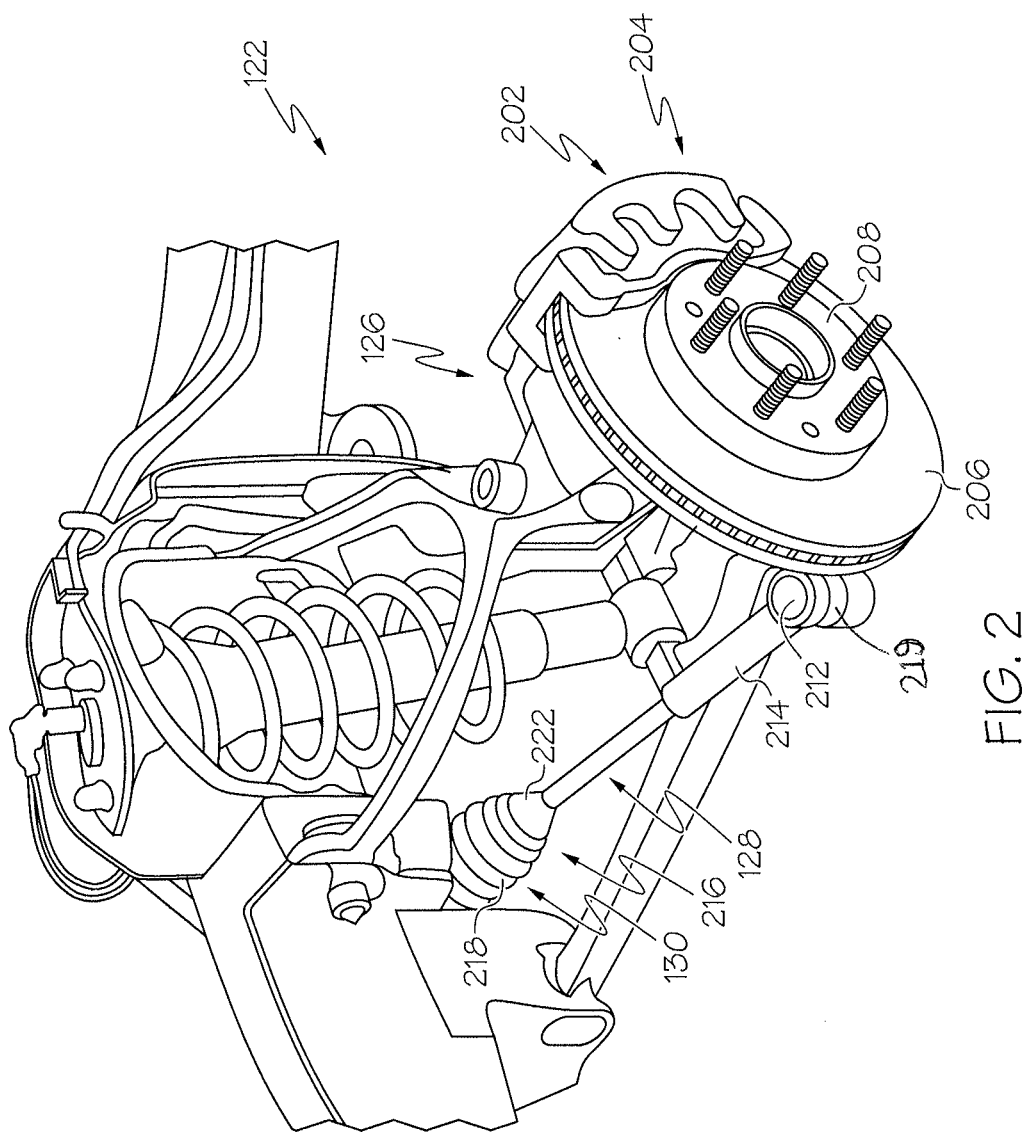
FIG. 2 schematically depicts a perspective view of a front suspension unit for the vehicle of FIG. 1 according to one or more embodiments shown or described herein.

Referring to FIG. 2, the front suspension unit 122 is shown in greater detail. In this illustrative example, the steering knuckle assembly 126 is connected to a front brake assembly 202 via a wheel spindle. The front brake assembly 202 briefly includes a caliper and brake shoe assembly 204, a rotor 206 and a brake pad 208. The tie rod 128 is rotatably connected at an outer end 214 to the steering knuckle assembly 126 at a first tie rod connecting location 219 via a knuckle arm 210 and connector 212 (e.g., a nut and bolt). The tie rod 128 is connected at an opposite, inner end 216 at a second tie rod connecting location 222 through a rack bellow 218 of the steering rack assembly 130.

Figure 3:
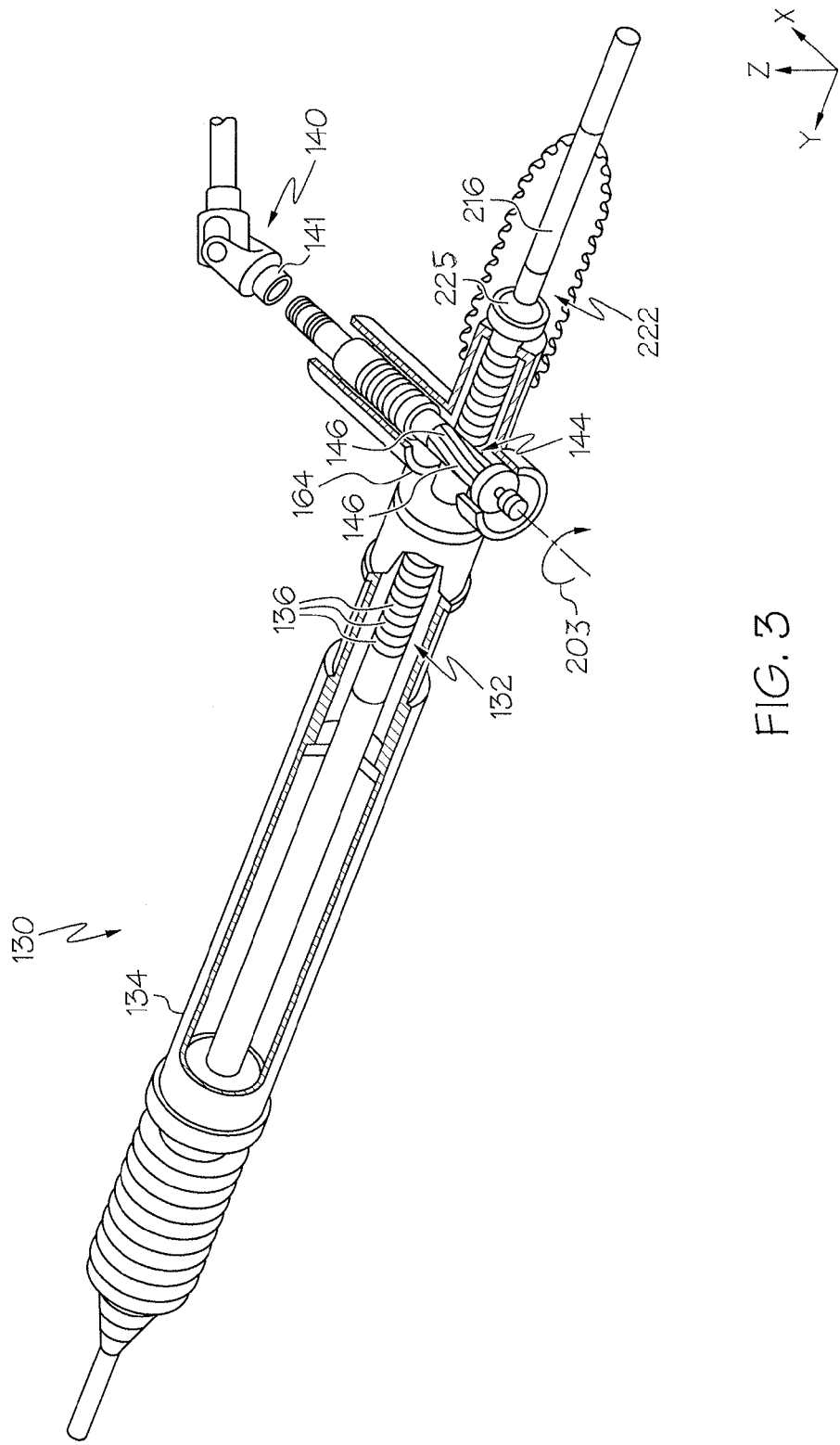
FIG. 3 schematically depicts a perspective view of a steering rack assembly and a steering column assembly of the steering system of FIG. 1 according to one or more embodiments shown or described herein.

FIG. 3 illustrates the steering rack assembly 130 with certain portions removed for clarity. The steering rack assembly 130 includes a rack 132 that is positioned within a housing 134. The housing 134 may be coupled to the body 110 of the vehicle such that a position of the housing 134 of the steering rack assembly 130 is generally fixed with respect to the body during normal vehicle operation. The inner end 216 of the tie rod 128 can extend through the rack bellow 218 to the second tie rod connecting location 222 where the inner end 216 is connected to the rack 132 via a connector 225, such as a ball and socket connection. The rack 132 is positioned at least partially within the housing 134. The rack 132 is configured to translate in the vehicle lateral direction with respect to the housing 134. Because the housing 134 is coupled to the body 110, the rack 132 is configured to translate in the vehicle lateral direction with respect to the body 110.

The steering column assembly 140 may include the pinion gear 144 that is coupled to the steering column 141, such that when the steering column 141 is rotated, the pinion gear 144 rotates about axis 203. The pinion gear 144 includes the plurality of teeth 146 that may engage a plurality of teeth 136 on the rack 132. As the pinion gear 144 rotates about axis 203, the engagement between the plurality of teeth 146 of the pinion gear 144 and the plurality of teeth 136 of the rack 132 causes the rack 132 to translate in the vehicle lateral direction. Similarly, when the rack 132 is translated, such as when an external force is applied to the rack 132, the engagement between the plurality of teeth 146 of the pinion gear 144 and the plurality of teeth 136 of the rack 132 can cause the pinion gear 144 to rotate.

Figure 4:
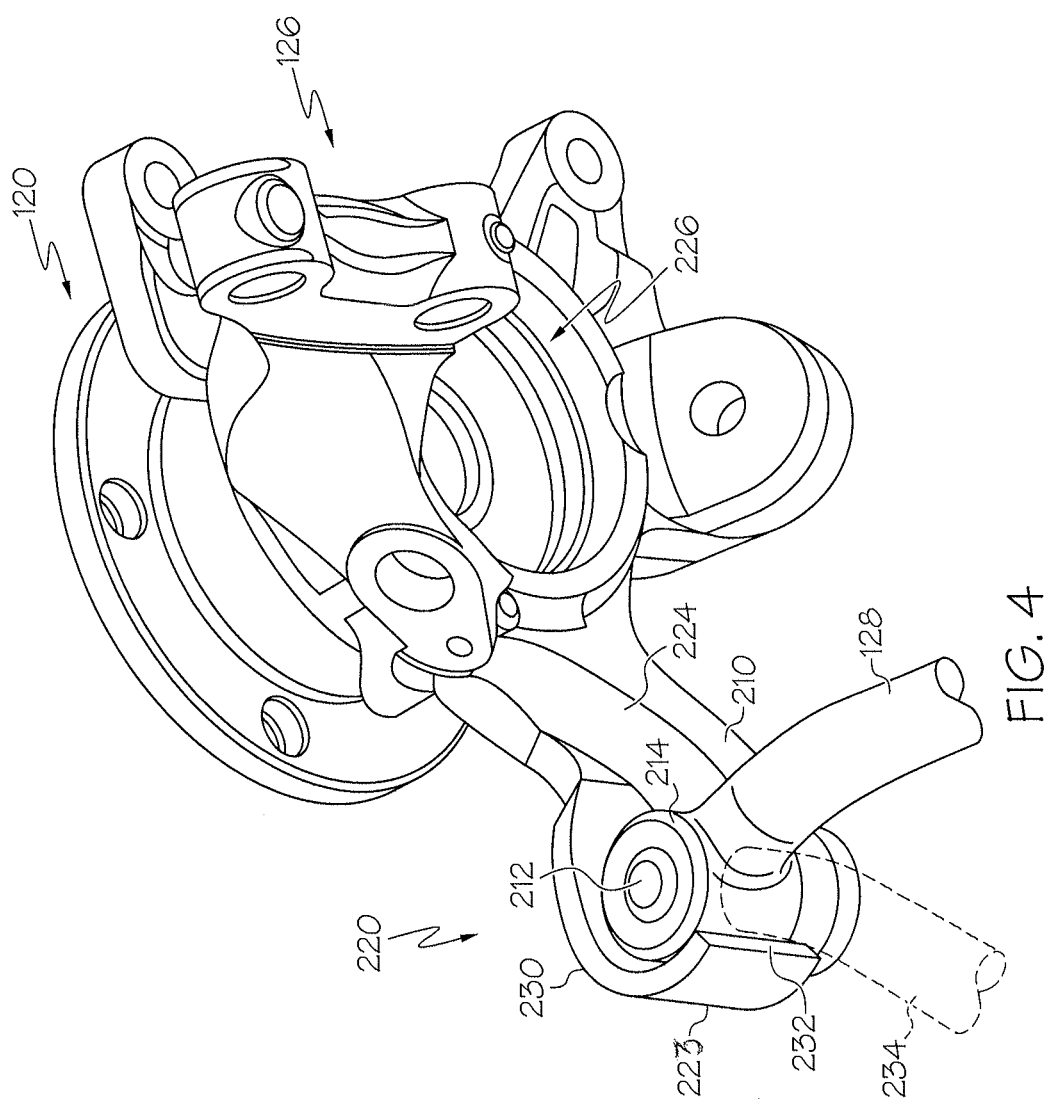
FIG. 4 schematically depicts a perspective view of a steering knuckle assembly including a tie rod disconnect feature according to one or more embodiments shown or described herein.
Figure 5:
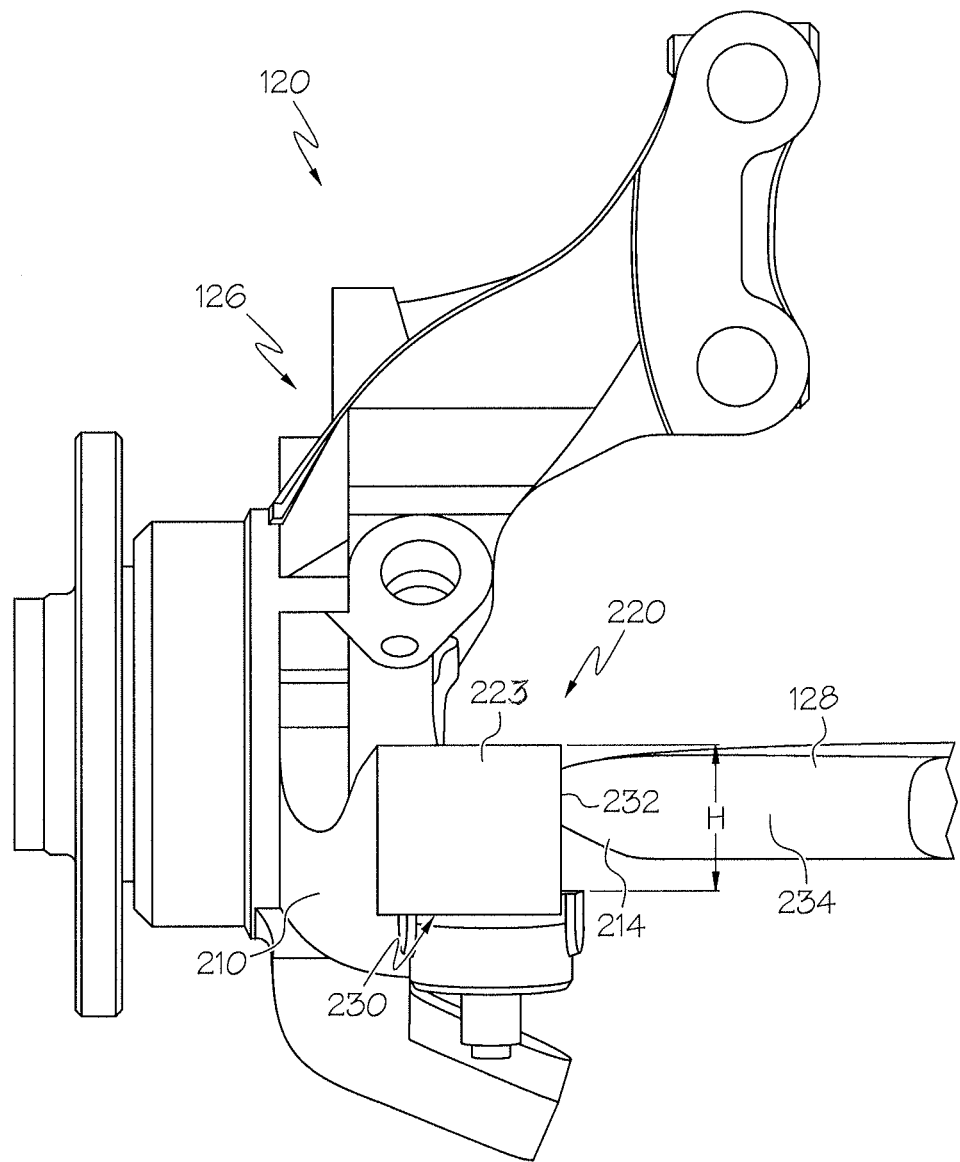
FIG. 5 schematically depicts an end view of the steering knuckle assembly of FIG. 4 including the tie rod disconnect feature according to one or more embodiments shown or described herein.

Referring to FIGS. 4 and 5, the steering system 120 includes a tie rod disconnect feature 220 that is arranged and configured to decouple the tie rod 128 from the steering knuckle assembly 126. In this embodiment, the tie rod disconnect feature 220 is located at the outer end 214 of the tie rod 128, connected to the knuckle arm 210 of the steering knuckle assembly 126. The tie rod disconnect feature 220 includes a stop wall 223 that extends outwardly from an arm surface 224 that supports the outer end 214 of the tie rod 128 thereon and distally away from a hub 226 of the steering knuckle assembly 126 along a length of the knuckle arm 210. The stop wall 223 may be an integral part of the knuckle arm 210 or formed separately and attached thereto, for example, by a weld. The stop wall 228 has an arcuate portion 230 that extends about only a portion of a periphery of the outer end 214 of the tie rod 128 to a stop surface 232, forming a recess that receives the outer end 214 of the tie rod 128. As can best be seen in FIG. 5, the stop wall 228 has a height H at the stop surface 232 that is sufficient to contact an outer portion 234 of the tie rod 128 when the tie rod 128 rotates to a predetermined angular stop position away from the hub 226 of the steering knuckle assembly 126. As shown by dotted lines in FIG. 4, when the tie rod 128 rotates to the predetermined angular stop position and contacts the stop surface 232 of the stop wall 228, further rotation creates a bending moment in the outer portion 234 of the tie rod 128, which can be used to sever the outer portion 234 of the tie rod 128 and/or disconnect the tie rod 128 at the connector 212.

Figure 6:
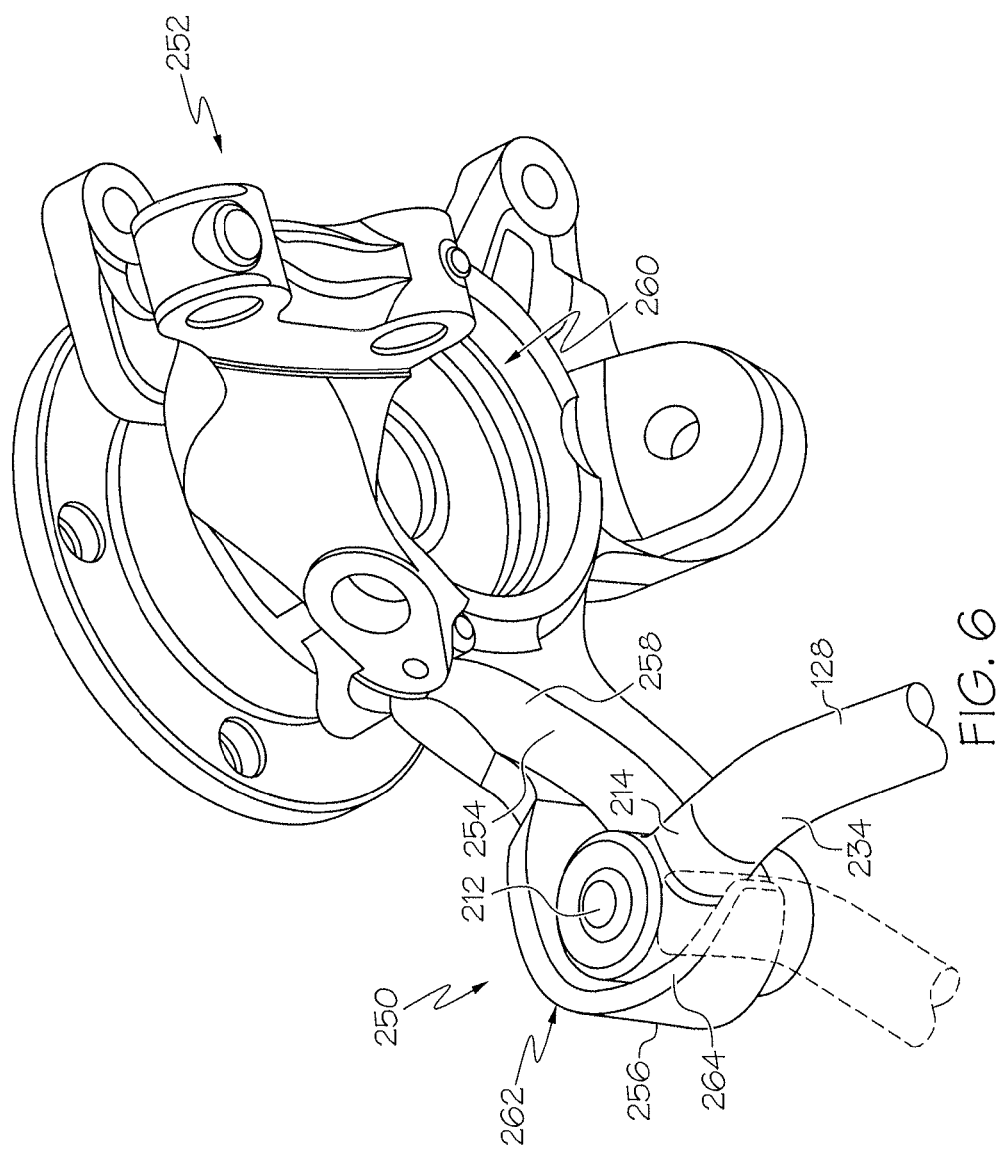
FIG. 6 schematically depicts a perspective view of another steering knuckle assembly including another tie rod disconnect feature according to one or more embodiments shown or described herein.
Figure 7:
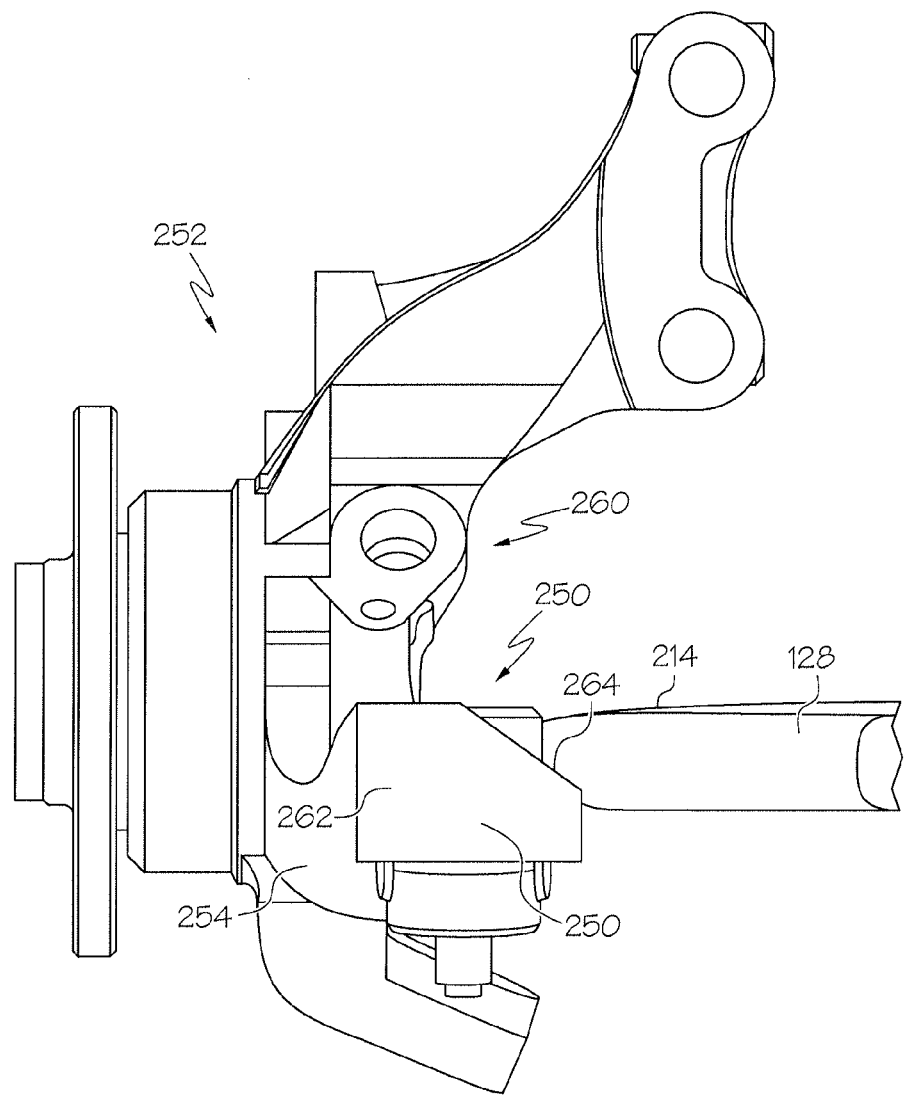
FIG. 7 schematically depicts an end view of the steering knuckle assembly of FIG. 6 including the tie rod disconnect feature according to one or more embodiments shown or described herein.

FIGS. 6 and 7 illustrate an alternative embodiment of a tie rod disconnect feature 250 that is arranged and configured to decouple the tie rod 128 from a steering knuckle assembly 252. In this embodiment, the tie rod disconnect feature 250 is located at the outer end 214 of the tie rod 128, connected to a knuckle arm 254 of the steering knuckle assembly 252. The tie rod disconnect feature 250 includes a stop wall 256 that extends outwardly from an arm surface 258 that supports the outer end 214 of the tie rod 128 thereon and distally away from a hub 260 of the steering knuckle assembly 252 along a length of the knuckle arm 254. Again, the stop wall 256 has an arcuate portion 262 that extends about only a portion of a periphery of the outer end 214 of the tie rod 128 to a stop surface 264, forming a recess that receives the outer end 214 of the tie rod 128. In this embodiment, the stop surface 264 is inclined or ramp-shaped to guide the outer portion 234 of the tie rod 128 away from the arm surface 258 and the connector 212. To this end, the shape and height of the stop surface 264 is selected to guide the outer end 214 away from the connector 212. When the tie rod 128 rotates to a predetermined angular position, as shown by the dotted lines of FIG. 6 and contacts the stop surface 264, the outer portion 234 of the tie rod 128 is guided away from the arm surface 258 thereby disconnecting the tie rod 128 from the steering knuckle assembly 252.

Figure 8:
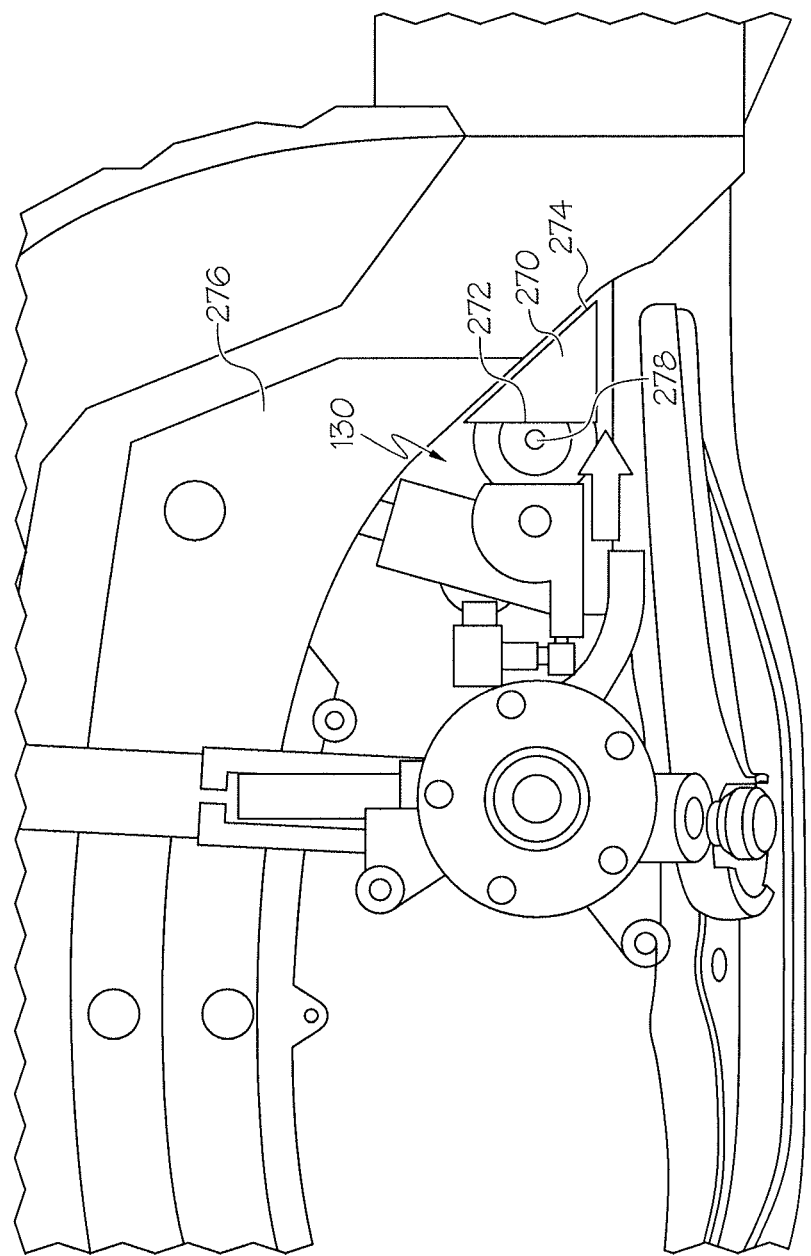
FIG. 8 schematically depicts another embodiment of a tie rod disconnect feature according to one or more embodiments shown or described herein.

While embodiments may decouple the steering system at the outer end 214 of the tie rod 128, embodiments, in addition to or in the alternative, may decouple a steering system at the inner end 216 of the tie rod 128. For example, FIG. 8 illustrates an embodiment that includes a tie rod disconnect feature 270 in the form of a catch having a stop surface 272. The tie rod disconnect feature 270 may include a mounting surface 274 that can be mounted to any suitable structural member of the vehicle such as each side member 276. A variety of joining techniques may be used to mount the tie rod disconnect feature 270, such as mechanical fasteners, spot welds, weld joints, structural adhesives, brazes, and the like. The tie rod disconnect feature 270 is arranged and configured to engage the steering rack assembly 130 as it translates in the vehicle longitudinal direction during a small overlap impact to sever an inner portion 278 of the tie rod 128 (FIG. 3) and/or disconnect the tie rod 128 at the connector 225 (FIG. 3).

When a barrier impacts a vehicle, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

In some impact configurations, an object may impact the front corner of the vehicle in what is referred to herein as a small front bumper overlap or a small overlap impact. In a small front bumper overlap impact, the impact occurs at an outboard portion of the vehicle (evaluated in a vehicle lateral direction), and only a portion of the front bumper impacts the object. In some small front bumper overlap impacts, only about 25% of the front bumper impacts the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the body 110 (FIG. 1) for example, may be non-symmetrically loaded when the vehicle is involved in a small overlap impact.

Referring to FIG. 1, when a barrier impacts a front corner of the vehicle 100 in a small front bumper overlap impact, energy associated with the impact may be directed into the front suspension unit 122 that is positioned proximate to the barrier. As the energy associated with the impact is directed into the front suspension unit 122, the energy may cause the front wheel 124 to rotate about axis 200 with respect to the body 110 of the vehicle 100. In some impact configurations, such as a small front bumper overlap impact, energy associated with the impact may cause the front suspension unit 122 to rotate about the axis 200 in a counterclockwise direction as depicted in FIG. 1 such that a rear portion 123 of the front wheel 124 rotates inboard in the vehicle lateral direction.

Energy associated with the collision may also cause the front suspension unit 122 to plastically and elastically deform and translate generally rearward in the vehicle longitudinal direction. As the front suspension unit 122 translates rearward in the vehicle longitudinal direction, the front suspension unit 122 and the front wheel 124 may contact the cabin 108 of the vehicle 100. When the front suspension unit 122 rotates in the counterclockwise direction about the axis 200 and the rear portion 123 of the front wheel 124 rotates inboard, the front wheel 124 may transmit more energy to the cabin 108 of the vehicle 100 as compared to when the front wheel 124 is maintained near a longitudinal orientation as depicted in FIG. 1.

As described hereinabove, when the front wheel 124 is rotated about the axis 200, the tie rod 128 and the rack 132 of the steering rack assembly 130 may translate in the vehicle lateral direction. As the rack 132 translates in the vehicle lateral direction, because the rack 132 is coupled to the steering column assembly 140, the steering column 141 may rotate, causing the steering wheel 142 to rotate. Accordingly, energy associated with the impact may cause the steering wheel 142 to rotate through the connections between the steering wheel 142 and the front wheel 124. In some impact configurations, such as a small front bumper overlap impact, the energy associated with the impact may cause the steering wheel 142 to rotate at a relatively high rotational speed. When the steering wheel 142 rotates at a relatively high rotational speed, the rotation of the steering wheel 142 may decrease the efficiency of supplemental restraints positioned within the steering wheel 142 as compared to when the steering wheel 142 does not rotate or does not rotate at a relatively high rotational speed.

The tie rod disconnect features described herein can be used to decouple the steering system to inhibit unintended rotation of a steering wheel, particularly during a small front bumper overlap impact. The tie rod disconnect feature may provide a stop or ramp surface that is used to influence movement of the tie rod and decouple the steering wheel from the rotating front wheel, which can reduce unintended rotation of the steering wheel due to external influences. Further, by limiting rotation of the steering wheel during an impact, the resistance device may prevent a decrease in effectiveness of the supplemental restraints (e.g., a driver airbag) that are positioned within the steering wheel.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a front wheel;
   a steering column assembly coupled to the front wheel, the steering column assembly comprising a steering wheel and a steering column coupled to the steering wheel;
   a steering rack assembly that comprises a rack coupled to the front wheel, wherein the rack extends in a vehicle lateral direction and is translatable with respect to a body of the vehicle in the vehicle lateral direction;
   a steering knuckle assembly coupled to the steering rack assembly by a tie rod, wherein the tie rod is rotatably coupled to the steering knuckle assembly; and
   a tie rod disconnect feature that decouples the steering knuckle assembly and the steering rack assembly upon rotation of the tie rod about the steering knuckle assembly beyond a predetermined angular stop position.

2. The vehicle of claim 1, wherein the steering knuckle assembly comprises a hub and a knuckle arm extending outwardly therefrom.

3. The vehicle of claim 2, wherein the tie rod disconnect feature is located at the knuckle arm.

4. The vehicle of claim 3, wherein the tie rod disconnect feature includes a stop wall having an arcuate portion that extends about only a portion of a periphery of an outer end of the tie rod that is pivotally connected to the knuckle arm to a stop surface.

5. The vehicle of claim 4, wherein the stop wall has a height at the stop surface that is sufficient to contact an outer portion of the tie rod when the tie rod rotates to the predetermined distance away from the hub of the steering knuckle assembly.

6. The vehicle of claim 4, wherein the stop surface is ramp-shaped and configured to guide the outer end of the tie rod away from the knuckle arm when the tie rod rotated to the predetermined distance away from the hub of the steering knuckle assembly.

7. The vehicle of claim 1, wherein the tie rod disconnect feature is connected to a structural member of the vehicle, the tie rod disconnect feature configured to engage the steering rack assembly to disconnect an inner end of the tie rod from the steering rack assembly during a small overlap impact.

8. A steering system for a vehicle comprising:
   a steering column assembly comprising a steering wheel and a steering column coupled to the steering wheel;
   a steering rack assembly that comprises a rack that extends in a vehicle lateral direction and is translatable with respect to a body of the vehicle in the vehicle lateral direction;
   a steering knuckle assembly coupled to the steering rack assembly by a tie rod, wherein the tie rod is rotatably coupled to the steering knuckle assembly; and
   a tie rod disconnect feature that decouples the steering knuckle assembly and the steering rack assembly upon rotation of the tie rod about the steering knuckle assembly beyond a predetermined angular stop position.

9. The steering system of claim 8, wherein the steering knuckle assembly comprises a hub and a knuckle arm extending outwardly therefrom.

10. The steering system of claim 9, wherein the tie rod disconnect feature is located at the knuckle arm.

11. The steering system of claim 10, wherein the tie rod disconnect feature includes a stop wall having an arcuate portion that extends about only a portion of a periphery of an outer end of the tie rod that is pivotally connected to the knuckle arm to a stop surface.

12. The steering system of claim 11, wherein the stop wall has a height at the stop surface that is sufficient to contact an outer portion of the tie rod when the tie rod rotates to the predetermined distance away from the hub of the steering knuckle assembly.

13. The steering system of claim 11, wherein the stop surface is ramp-shaped and configured to guide the outer end of the tie rod away from the knuckle arm when the tie rod rotated to the predetermined distance away from the hub of the steering knuckle assembly.

14. The steering system of claim 8, wherein the tie rod disconnect feature is connected to a structural member of the vehicle, the tie rod disconnect feature configured to engage the steering rack assembly to disconnect an inner end of the tie rod from the steering rack assembly during a small overlap impact.

15. A method of decoupling a steering wheel of a vehicle from a front wheel of the vehicle, the method comprising:
   contacting an object with the front wheel of the vehicle, the object rotating the front wheel out of a driving direction of the vehicle; and
   decoupling a steering knuckle assembly and steering rack assembly by disconnecting a tie rod using a tie rod disconnect feature that decouples the steering knuckle assembly and the steering rack assembly upon rotation of the tie rod about the steering knuckle assembly beyond a predetermined angular stop position.

16. The method of claim 15, wherein the steering knuckle assembly comprises a hub and a knuckle arm extending outwardly therefrom.

17. The method of claim 16, wherein the tie rod disconnect feature is located at the knuckle arm.

18. The method of claim 17, wherein the tie rod disconnect feature includes a stop wall having an arcuate portion that extends about only a portion of a periphery of an outer end of the tie rod that is pivotally connected to the knuckle arm to a stop surface.

19. The method of claim 18, wherein the stop wall has a height at the stop surface that is sufficient to contact an outer portion of the tie rod when the tie rod rotates to the predetermined distance away from the hub of the steering knuckle assembly.

20. The method of claim 18, wherein the stop surface is ramp-shaped and configured to guide the outer end of the tie rod away from the knuckle arm when the tie rod rotated to the predetermined distance away from the hub of the steering knuckle assembly.

\* \* \* \* \*